United States Patent [19]

Gutsche

[11] Patent Number: 4,707,979
[45] Date of Patent: Nov. 24, 1987

[54] METHOD FOR STORING AND RE-RADIATING ENERGY TO PROVIDE PROPULSION FORCES ON DEVICES

[76] Inventor: Gunter E. Gutsche, 4476 Forget, St. Louis de Terrebonne, Quebec, Canada

[21] Appl. No.: 760,087

[22] Filed: Jul. 29, 1985

Related U.S. Application Data

[63] Continuation-in-part of Ser. No. 471,306, Mar. 2, 1983, abandoned.

[51] Int. Cl.$^4$ .............................................. F02C 11/00
[52] U.S. Cl. ...................................... 60/203.1; 60/204
[58] Field of Search .................... 60/200.1, 201, 203.1, 60/204; 244/173

[56] References Cited

U.S. PATENT DOCUMENTS

| | | | |
|---|---|---|---|
| 3,083,528 | 4/1963 | Brown | 60/203.1 |
| 3,258,598 | 6/1966 | Schalkowsky | 244/173 |
| 3,427,808 | 2/1969 | Butcher | 60/203.1 |

OTHER PUBLICATIONS

Cameron, A. G. W., "The Origin and Evolution of the Solar System", Scientific American, Sept. 1975.
Sargent, D. A., *Comets, Vagabonds in Space*, Doubleday, Garden City, N.Y. (date unknown).
Calder, N., *The Comet is Coming*, BBC Publishing, London (date unknown).

*Primary Examiner*—Louis J. Casaregola

[57] ABSTRACT

The present invention relates to a method to produce and utilize propulsion forces on objects or devices by the controlled release of energy derived from absorbed radiation. The direction of the propulsion forces is controlled by controlling the rotation, configuration and composition of the absorber. Apparatuses are provided that comprise a rotating absorber and means to control the direction of the required thrust forces by adjusting the rotation, temperature, position of absorbing members, amount and kind of storing substance, by selective shading of the rotating absorber and re-directing the released energy once emitted.

12 Claims, 6 Drawing Figures

METHOD FOR STORING AND RE-RADIATING ENERGY TO PROVIDE PROPULSION FORCES ON DEVICES

This is a continuation in part application of patent application Ser. No. 471,306, filed 03/02/1983, now abandoned.

BACKGROUND OF THE INVENTION

1. Field of the Invention

The present invention relates to a method for providing thrust forces on objects or devices by the release of energy derived from the absorption of radiant energy. The invention also relates to apparatus for efficiently carrying out the disclosed method.

2. Cross References and Related Applications

The applicant of the present invention has filed on Feb. 14, 1980 an application bearing the title: "Method and Apparatus for Use in Harnessing Solar Energy to provide Initial Acceleration and Propulsion on Devices" and Ser. No. 121,493 now U.S. Pat. No. 4,403,755.

3. Description of the Prior Art

Devices such as space craft move in an environment where their orbital and rotational movement is affected by the friction of particles, gravitational, magnetic and electric forces and radiation pressure. On many satellites the effect of these forces is considerable and cause significant undesirable variations in their orbits and orientation. Correction of these variations are made mostly by the use of the well known booster and vernier rocket motors. The use of such thrusters always entails the expenditure of propellants that have to be brought to altitude at great cost. Solar radiation or radiation beamed from an artificial source has therefore been proposed and used as a source of energy for producing torque and propulsion forces on such devices. An example of maintaining the spin of a satellite by the pressure of reflected radiation is the U.S. Pat. No. 3,057,579 to Cutler, where vanes with differing absorbing and reflecting properties generate torque forces when exposed to solar radiation. Several Solar Sail configurations are proposed in the prior art, one being U.S. Pat. No. 4,262,867 to Piening in which solar sails are positioned to move or rotate a satellite by means of solar radiation reflected from them. In the U.S. Pat. No. 3,588,000 to Buckingham a reflecting surface is selectively tilted to provide propulsion forces during part of an orbit. Similarly in U.S. Pat. No. 3,386,686 to Phillips a solar sail is exposed at various angles during different orbital phases to provide energy input into the orbital movement. All the above cited prior art use the well known effect of radiation pressure on reflective surfaces.

By contrast, the present invention uses a novel method to harness the effect of radiation on an absorbing and rotating body to produce torque and propulsion forces. In this the present invention differs from the teachings of applicants disclosure in U.S. Pat. No. 4,403,755 cited in the Cross Reference, where an airfoil is propelled and lifted by fluid heated by absorbed solar radiation that is conveyed by conduction to traverse the absorber to the area of release.

Satellites that rotate in the rays of the sun are known. On many of these the rotations is random and described by those skilled in the art as "tumbling". An example of this are the Balloon satellites of the "Echo" series. Other satellites have been given a rotation with respect to the sun to maintain a given average temperature. Others rotate in this way to maintain orientation toward the surface of the earth or other orbiting object. Further reasons to rotate a space craft are the creating of artificial gravity by centrifugal forces and stabilization of the spin axis. Several ways are known to those skilled in the art to impart spin on spacecraft to accomplish the above cited effects. Besides the methods used that are already mentioned there is the early method of giving spin to the launch vehicle by the use of control surfaces in the atmosphere or in the exhaust gases of the rocket motor. Recently spin has been imparted on satellites by various devices prior to release from the carrier vehicle like the Space Shuttle. In flight control of the rotation of satellites is well known to those skilled in the art by the use of gravitation gradient devices, inertia wheels and the like.

The present invention makes a totally different, novel and synergistic use of any such random or artificially produced rotation by identifying and harnessing the effects of radiation on an absorbing and rotating body. Radiation such as sunlight imparts energy to a body it strikes in the form of radiation pressure and additionally when absorbed in the form of latent energy such as heat or kinetic energy or the potential energy forms inherent in phase changes of a substance or in chemical reactions. It is well known that the amount of energy derived from absorption of solar energy exceeds by several magnitudes the energy obtained even from a reflected solar ray. Accordingly in the demonstrations of the effects of radiation pressure, care had to be taken to eliminate the effect of the absorbed radiation on particles adjacent to the receiving vanes. Further it is established that radiation exerts a pressure when emitted or reflected from a surface as well as when striking a surface. Since according to Kirchoffs law the amount of radiant energy received on a body in thermal balance must equal the amount of radiant heat energy released from such a body, the total pressure of radiation emitted from such a body must equal the radiation pressure of the radiation striking the body. The temperature at which the heat balance of a body reflecting or absorbing and re-radiating radiation is established and affected by the Stephan-Boltzmann law which states that energy is emitted at a rate proportional to the fourth power of the absolute or K temperature of its surface. Since the pressure that radiation exerts is proportional to the temperature of the emittor and hence the rate of emission, a preferential thrust can be generated by energy released from a device if a temperature difference can be selectively created facing a selected direction. The created force can be greatly enhanced if in addition to the pressure of reradiation any particles adjacent to the emitting surface are energized and repulsed.

In the process of absorbing solar energy and reradiating it at a longer wave length is inherent a certain time lag. In the environment of satellites orbiting the earth it can take a surface radiating at 300% K four times longer to release the energy into space than it took to absorb it when facing the sun. The radiation laws governing these processes make it accordingly possible to generate on an absorbing and rotating body thrust forces for propulsion and torque generating purposes using the disclosed method. The steps of this method are further synergistic with the mentioned inherent functions of the satellites and represent accordingly an unexpected boon to their operation.

The patent literature is replete with examples of inventions that successfully use laws that can be observed to govern processes in the natural environment. All inventions must accordingly in some way resemble structures or processes observable in nature. Serious doubt might be raised about the functioning of any invention for which an equivalent can not be found in the natural environment. The present invention is no exception to this rule. Comparison has shown that most planets transporting absorbed solar energy to their evening side radiate that excess energy toward their trailing side on their orbit. Further, rare references are made in the literature dealing with astrophysics to the effect of solar radiation on rotating bodies. For example the SCIENTIFIC AMERICAN book "The Solar System" on page 23 states: "Larger solids, up to a kilometer in diameter, are perturbed by sunlight in a different way. As such a body rotates the temperature of a section of its surface increases as long as it is on the sunlit side but decreases while it is on the dark side. One hemisphere of the body therefore emits considerable more radiation than the other. That gives rise to a preferential thrust that can perturb the orbit of the body either toward the sun or away from it, depending on the bodies direction of rotation." The book "The Neighbours of the Earth", page 187 relates about comets:"-This causes a rebound, which would be directed radially away from the sun in a nonrotating comet, but which possesses either a forward component in a comet that rotates in retrograde sense (opposite to its orbital motion), or a retarding component when the rotation is direct. This asymtry is caused by the lag required to heat through a sufficiently thick layer of the ice to get the evaporation going. - When Whipple applied it to comet Encke, it explained in a most convincing manner the tendency of this comet to spiral slowly inward toward the sun. - The comet head rotates -, the heated area being carried a short distance into the dark region. Direct rotation produces a rebound that increases the orbital motion, and the comet spirals outward, this is the case of Comet D'Arrest. -" Although applicants disclosed method differs substantially from the described natural phenomena, they illustrate the result of radiation being absorbed by a rotating body. These references show convincingly that longer lasting orbits can be achieved by selectively rotating a body so as to transport energy to its trailing side of the orbit, thus increasing the orbital velocity. Most satellites are lost of course because of gradual loss of orbital velocity or increased orbital eccentricity. The functioning and usefulness of the present invention is thus credibly stated. In contrast with the prior art devices, the functioning of the present invention relies on the controlled and selective absorption of radiant energy and the transporting and release of the energy thus derived on a rotating body. One factor of controlling the direction of the thus generated thrust force is accordingly the control of the rotation of the absorbing body which effects the rate of its absorption and energy release. Of all the previously mentioned ways to control the spin of a device, a preferred method in accordance with the present invention is to achieve this with the same medium as the propulsion forces, namely the release of energy derived from absorbed solar radiation. This method is again the opposite of the functioning of the prior art which uses reflected or deflected solar radiation for this purpose. Since almost all substances expand as they are heated and on a rotating body the side exposed to radiation experiences a rise in temperature as it sweeps past the source of radiation, the torque forces generated by the radiation on the side receding from the radiation are greater than those on the advancing side. The carrying out of the disclosed method to produce thrust forces on a rotating body can thus be simultaneously used to maintain and control the steps of the invented method, namely the control of the rate of rotation, and thereby the rate of the absorption, transportation and direction of the release of the energy derived from the radiant energy.

From the following description it will be seen that the present invention can be carried out on any suitable object, or on an already existing device having suitable equipment. Greater efficiency in carrying out the disclosed method is obtained by the use of the novel apparatus described in the disclosure.

4. SUMMARY OF THE INVENTION

It is therefore the object of the present invention to provide a method and apparatus to generate propulsion and torque forces by using absorbed radiant energy.

Another object of the invention is to control the effect of radiant energy on the movement of a device.

A further obJect of the invention is to reduce the effect of radiation pressure from a beam of radiation on a device and to generate a force in a selected direction at an angle to the direction of that beam on the device.

Another object of the invention is to combine the advantages of rotation of a device with the generation of torque and propulsion forces by means of absorbed radiation.

Another object of the invention is to produce thrust forces on a device without either introducing contaminants into the environment, or requiring the use of a limited supply of propellant.

Another object of the present invention is to produce thrust forces on inert objects such a space debris to influence their movement with a minimum expenditure of energy.

The objects of the present invention are accomplished by the following method, steps and embodiments.

In one aspect of the present invention there is provided a method for providing thrust forces in a selected direction on an inert object such as a piece of space debris. These thrust forces are generated by means of harnessing the reaction forces resulting from the delayed and directionally changed release of storable energy obtained on the object by absorbing the radiant energy coming from the direction of an energy source. Such object must have a surface portion that can be nudged into rotation and be absorbent to the said radiant energy and be able to store the absorbed energy in some form of storable energy like heat and apt to release this energy in the form of radiation and by energizing free particles in the adjacent environment. The method comprises the following steps: (a) according to need selecting the direction of the required thrust forces, (b) bringing forces to bear on the absorbing surface portion to cause it to rotate with respect to the said energy source in a direction that will allow transporting of energy from the energy source into a direction opposite to the direction of the required thrust force, (c) causing the surface portion to absorb radiant energy in the direction facing the energy source, converting the absorbed energy to storable energy and transport the energy stored on the surface portion by its rotation to a location substantially opposite the direction of the required thrust force, (d) causing said storable energy to be released from the surface portion at that location as radiation into said adjacent environment, thereby generating radiation pressure on the surface portion by reaction to the emitted radiation, (e) causing the release of the storable energy in said location by energizing free particles adjacent to the surface portion thereby generating a thrust force substantially in the selected direction by the reaction to the departure with increased kinetic energy of the free particles and (f) causing by the releasing of said storable energy at the selected location a decline in the amount of stored energy in said surface portion, so that the amount of storable energy released in the direction opposite to the required direction of thrust is greater than in the direction of the required thrust.

In another aspect of the invention the above described method is carried out on a device of the prior art having means to create torque forces so as to rotate an absorbing surface portion with respect to a source of radiant energy and the method comprises the step of activating these torque generating means to selectively control the direction and rate of spin of that devices' absorbing surface portion so as to produce thrust forces in a selected direction by the release of stored energy derived from the absorption of radiant energy.

In another aspect of the present invention the method is carried out on an apparatus or device in accordance with the present invention where there are provided means to control the direction of the thrust forces generated by the release of said storable energy, said means comprising vanes extending outward from said absorbent surface portion in a substantially tangential angle with respect to said axis of rotation and where said method comprises the further step of absorbing the radiant energy from the source of energy on said surface portion where said radiant energy strikes said vanes edge-on and absorbing said radiant energy on said vanes where said vanes are substantially normal to said radiant energy, thereby absorbing more of said radiant energy and releasing more of said storable energy of the vanes normal to said radiant energy, thus creating greater thrust forces in the direction facing away from the vanes where more of said radiant energy was absorbed.

In another aspect of the present invention the disclosed method is carried out on an apparatus or a device in accordance with the present invention where there are provided control means to control the direction of the thrust forces produced by the release of storable energy derived from the absorption of radiant energy, said control means comprising heat expandable members disposed on said surface portion, said method comprising the further step of: increasing the distance of said heat expendable members to said axis of rotation by heating them with said storable energy during exposure to said radiant energy and to decrease the distance of said heat expandable members to said axis of rotation by cooling them through release of said storable energy.

In another aspect of the present invention the method is carried out on an apparatus or device in accordance with the present invention where there are provided means to control the direction of the thrust forces produced by the release of storable energy derived from absorbed radiant energy, said control means comprising absorbent members or vanes movably attached to said device and tiltable in respect to said device or said source of radiant energy by actuators, said method comprising the further step of selectively controlling the tilt of said members with respect to said axis of rotation by activating said actuators so as to control the direction of absorption of said radiant energy and the direction of release of said storable energy, thereby determining the direction of the thrust forces produced by the reaction to said release, on said surface portion, said method comprising the further step of creating an increased distance of said members by heating said heat expandable members with said storable energy during exposure to said radiant energy, said method comprising the further step of creating a decreased distance of said members from said axis of rotation by cooling said heat expandable member by the release of said storable energy, thereby creating thrust forces directed from said heated members toward said cooled members.

In another aspect of the present invention on the method is carried out on a device in accordance with the present invention wherein said absorbent surface portion comprises containers containing a substance for storing said storable energy and said device comprises means to selectively changing the amount of said substance, and the method comprises the further step of activating said means to change the amount of said substance.

In yet another aspect of the invention the method is carried out on a device in accordance with the present invention wherein said absorbent surface portion comprises containers containing a phase changing substance and where said method comprises the further step of changing the state of said substance in order to store said storable energy and to change the state of said substance in order to release said storable energy, thereby controlling the temperature of said containers and the rate of release and direction of release of said storable energy.

In yet another aspect of the present invention the method is carried out with a device in accordance with the present invention having focusing means for concentrating the radiation from said source of energy onto a selected area of the absorbing surface portion and where said method comprises the further step of concentrating said radiation by said focusing means onto said selected area in order to there increase the level or amount of storable energy derived from the absorption of the radiant energy.

In another aspect of the present invention the method is carried out on a device in accordance with the present invention where the absorbing surface portion is disposed about a member that is rotatably mounted on an axis of rotation provided on said device and where drive means are provided to rotate the absorbing surface portion with respect to said device and where the disclosed method comprises the further step of controlling the direction and rate of rotation of the absorbing surface portion with respect to the device by selectively activating the said drive means to control the rate and direction of the rotation of the absorbing portion on said member.

In another aspect of the present invention the disclosed method is carried out with a device in accordance with the present invention having shading means disposed between said energy source and said absorbing surface portion or the environment and said surface portion, said shading means selectively positionable to intercept radiation striking or emitted from said absorbent surface portion at a selected location, the method comprising the further step of positioning said shading means so as to admit said radiant energy from a selected direction and positioning said shading means so as to intercept the energy released from said surface portion in a direction substantially in the direction of the required thrust forces and to direct the release of the stored energy in a direction opposite to the required thrust forces.

In another aspect of the present invention the method is carried out with a device in accordance with the present invention having directing means to establish the direction of departure of energy and particles leaving the absorbing surface portion, said method comprising the further step of redirecting radiation released from said surface portion and free particles repelled from said surface portion into a direction substantially opposite to the required thrust.

In another aspect of the present invention the disclosed method is carried out on a device according to the present invention that is adapted to receive radiant energy that is diffuse or is originating from more than one direction or energy sources and the device comprises at least two counterrotatingly arranged members having absorbing surface portion, said two members disposed about two axis of rotation linked by a framework defining a plane and having means to control the attitude of said framework, and drive means to control the rotation of said members, said method comprising the further step of orientating the plane defined by linking the two axis of rotation substantially normal to the selected direction of the required thrust and the further step of rotating said members with said drive means in a counterrotating movement so that the absorbing surface portions are converging when they are facing away from the required direction of thrust forces.

In another aspect of the present invention there is provided a device having an axis of rotation and an absorbent surface portion exposable to the environment and a source of radiant energy, said surface portion treated and adapted to absorb said radiant energy, to convert said radiant energy to storable energy and to store said storable energy, the improvement comprising: control means to control the direction of the thrust forces produced by the release of said storable energy during the rotation of said surface portion about said axis of rotation, said control means comprising members or vanes extending outward from said surface portion in a substantial tangential angle with respect to said axis of rotation, said vanes having absorbent skins facing away from said axis of rotation and insulating surfaces facing toward said axis of rotation, whereby some of said radiant energy is absorbed on said absorbent surface portion close to said axis of rotation and some of said radiant energy is absorbed on said absorbent skins substantially normal and at a greater distance than said surface portion, whereby more of said radiant energy is absorbed at a greater distance from said axis of rotation in a selected direction on said device thus controlling the direction of the thrust forces generated by the release of said storable energy.

In another aspect of the present invention there is provided a device wherein said members or vanes are adapted to selectively change said angle with respect to said axis of rotation, said members comprise a heat-expandable substance or material positioned on said vane to be heatable by said storable energy and to expand when heated and storing said storable energy, and to generate when heated and expanded a a greater distance of said members to said axis of rotation and to generate when cooled and contracted by the release of said storable energy a smaller distance of said members to said axis of rotation.

In another aspect of the present invention there is provided a device wherein said absorbent members or vanes are movably attached to said surface portion and wherein said control means comprise actuators adapted to selectively tilt said members in respect to said axis of rotation said actuators controllable by signals from a command unit adapted to receive manual or remote commands for processing to produce said signals or to compute said signals from data received from sensors monitoring the temperature or the rotation or the attitude and position of said device, whereby when said command unit determines the appropriate signals and sends them to said actuators, said members are selectively tilted in respect to said axis of rotation and absorb said radiant energy in a selected direction and release said storable energy in a selected direction thus creating thrust forces on said device in a selected direction.

In another aspect of the present invention there is provided a device having an axis of rotation and comprising at least one absorbent surface portion disposed about said axis of rotation and exposable to the environment and to a source of radiant energy, said surface portion treated and adapted to absorb said radiant energy, to convert said radiant energy to storable energy, and to store said storable energy, the improvement comprising: control means to control the direction of the thrust forces produced by the release of said storable energy during the rotation of said surface portion about said axis of rotation, said control means comprising absorbent containers disposed adjacent said surface portion said containers containing a substance for storing said storable energy, said container comprising means or a pump for varying the amount of said substance in said container, whereby the amount of said substance in said container can be selectively varied, thereby controlling its temperature and hence the rate and direction of release of said storable energy during said rotation.

In another aspect of the present invention there is provided a device or vehicle having an axis of rotation and comprising at least one absorbent surface portion disposed about said axis of rotation and exposable to the environment and a source of radiant energy, said surface portion treated and adapted to absorb said radiant energy, to convert said radiant energy to storable energy and to store said storable energy, the improvement comprising: control means to control the direction of the thrust forces produced by the release of said storable energy during the rotation of said surface portion about said axis of rotation, said control means comprising focusing means for concentrating said radiant energy onto a selected area of said surface portion, said focusing means disposed externally on said surface portion, whereby the amount of storable energy stored in said area is increased and the early release of said storable energy accelerated.

In another aspect of the present invention there is provided a device or vehicle having an axis of rotation and comprising at least one absorbent surface portion disposed about said axis of rotation exposable to the environment and a source of radiant energy, said surface portion treated and adapted to absorb said radiant energy, to convert said radiant energy to storable energy and to store said storable energy, the improvement comprising: control means to control the direction of the thrust forces produced by the controlled release of said storable energy during the rotation of said surface portion, said surface portion comprising containers containing a phase-changing substance, whereby said containers are kept at a low temperature during the absorption of said radiant energy and additional storable energy is available in a selected direction by heat released during phase-change of said phase-changing substance.

In another aspect of the present invention there is provided a device or vehicle stabilized in its attitude by stabilizing means, said device comprising a member rotatably mounted on an axis of rotation located near the center of mass of said device, said member comprising an absorbing surface portion treated to absorb radiant energy from a source of energy, to convert said radiant energy to storable energy and to store said storable energy, said surface portion positioned on said member to be exposable to said source of radiant energy and to the environment away from said source of energy, the improvement comprising: drive means to control the rate and direction of the rotation of said rotatably mounted member with respect to said device, said drive means comprising a motor adapted to transfer forces in a selected direction to said surface portion, said motor controllable by signals from a command unit adapted to receive manual or remote commands for processing to produce said signals or compute said signals from sensors monitoring the temperature or the rotation or the attitude and position of said device, whereby when said command unit determines the appropriate signals and sends them to said motor, it produces forces in a selected direction on said surface portion to regulate its movement so as to cause the release of said storable energy in the selected direction to produce said thrust.

In another aspect of the present invention there is provided a device or vehicle wherein there are provided shading or filtering means disposed on said device between said environment and said surface portion, said shading means selectively positionable by positioning means and adapted to intercept at least part of said radiant energy from said source of radiant energy and to intercept at least part of said radiation released from said surface portion and to intercept said energized free particles, said positioning means comprising a motor and suitable gearing, said motor controllable manually or by signals from a command unit adapted to produce said signals from manual or remote input or from data received from sensors monitoring the temperature or rotation or attitude or position of said device.

In a further aspect of the present invention there is provided a device wherein are provided directing means to control the direction of radiation once it has been emitted from said surface portion and the direction of said energized free particles after they have been repelled from said surface portion, said directing means comprising positionable reflectors disposed on said device between said surface portion and said environment, said reflectors positionable by actuators and suitable linkage, said actuators controllable manually or by signals from a command unit adapted to receive manual or remote input or to compute said signals from data received from sensors that monitor the temperature, or rotation or attitude or position of said device, whereby when said reflectors are suitably positioned, said radiation and said energized free particles are re-directed to leave said device in a selected direction and impart on said device a thrust force opposite to said selected direction.

In a further aspect of the present invention there is provided a device comprising at least one further rotatably mounted member or rotor mounted on a second axis of rotation provided on said device and located equidistant from said center of mass with said axis of rotation, said further member comprising at least one absorbent surface portion treated and adapted to absorb radiation from a source of radiant energy, to convert said radiant energy to storable energy to store said storable energy and to release said storable energy into the environment in the form of radiation and of energized free particles, said drive means adapted and positioned to control the direction and rate of rotation of said further member in a counterrotating movement with respect to the rotation of said member, whereby said storable energy is transported toward the direction on said device where said movement is converging.

BRIEF DESCRIPTION OF THE DRAWINGS

The present invention is illustrated by way of example in the following drawings wherein.

DESCRIPTION OF THE PREFERRED EMBODIMENTS

Figure 1:
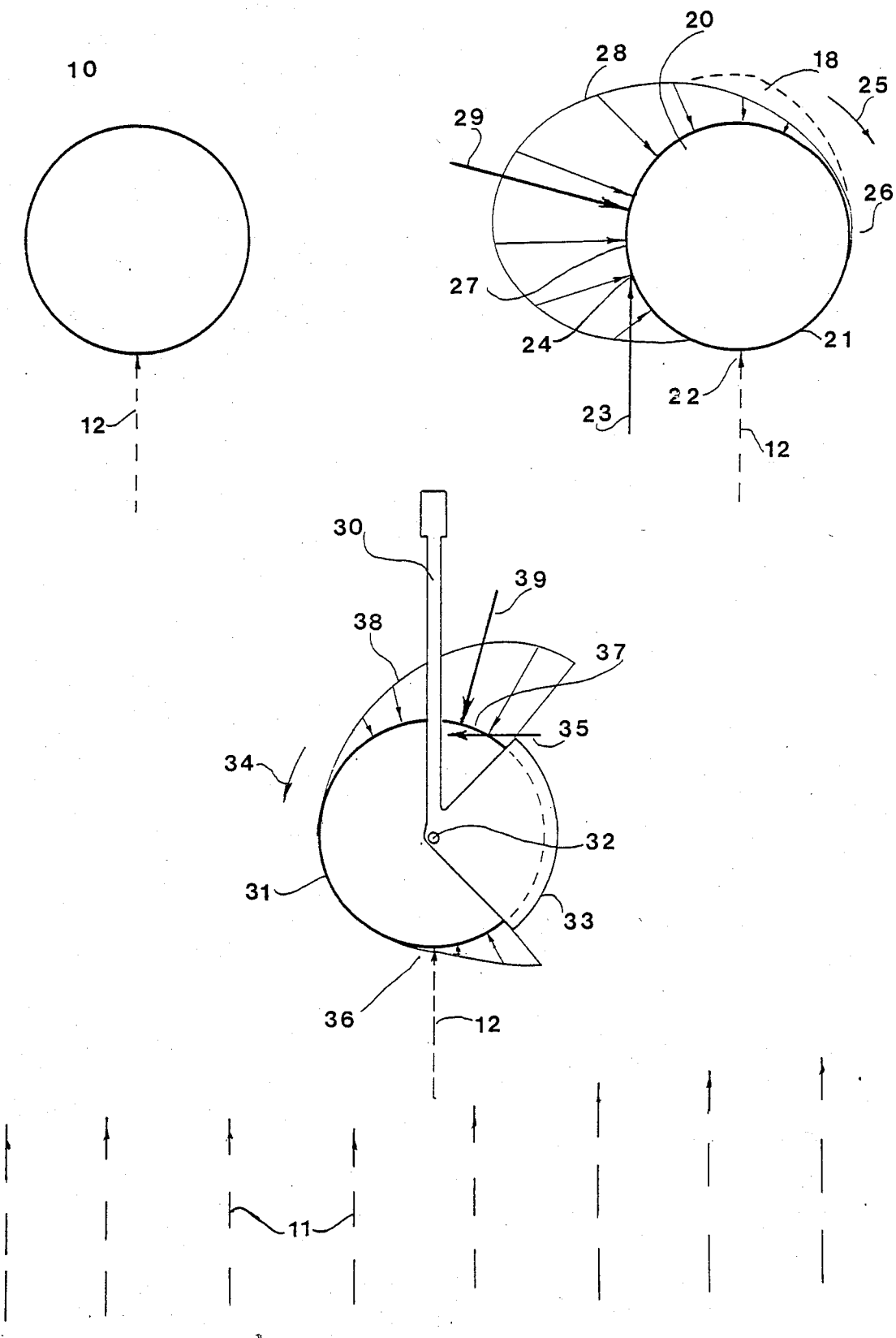
FIG. 1 is a diagrammatic top view of three space vehicles exposed to solar radiation.

Referring now in detail to the drawings. FIG. 1 shows diagrammatically an inactive space craft or obJect 10, space craft 20 and space craft 30, the three have the same absorbtance and are closely spaced on station in orbit. The three are exposed to the direct solar radiation 11 but that radiation can also be from an artificial source as contemplated and known by those skilled in the art. The resultants of the forces from this directly absorbed radiant energy is shown in phantom line arrows 12, and these resultants remain equal for the three objects since their absorbance is substantially equal. Using the method disclosed in the present invention it is now possible to change the spacing between the space craft 20 and 30 or increase or decrease their orbital velocity as compared to space object 10. Space craft 20 has absorbent surface portion 21, and solar radiation 11 is absorbed there at the location 22 which always faces the source of the radiant energy 11. Upon determining the desired movement of device 20 in respect to obJect 10, it is established which is the direction of the required thrust force. In this case it is assumed that one wishes to increase the separation of devices 10 and 20, and a force 23 is brought to bear on surface portion 21 at location 24, resulting in rotation of surface portion 21 indicated by arrow 25. This force 23 can be generated in any one of the appropriate ways known to those skilled in the art namely a radiation or particle beam, nudging with a projectile or spinning it with the means available on a carrier like Space Shuttle. Alternately such selective rotation can be induced on active spacecraft by activating torque generating devices such as auxiliary thrusters or those of the disclosed embodiments. By the rotation 25, radiation 11 that has been absorbed adjacent to location 22 and converted to a storable energy such as heat or latent energy in surface portion 21, is transported as it is held or stored in surface portion 21 into the area denoted by the numeral 26 which during the greater part of an orbit faces the environment 27 of outer space with a radiation temperature of 10° K. This condition strongly favors the release of the latent energy in the form of radiation, which is governed by the Stephan-Boltzmann law. This radiation law establishes that the energy released from a surface is proportional to the fourth power of the temperature difference between the emitting surface and the receiver. For the purpose of illustration let it be assumed that the surface portion 21 has been heated by passing in rotation through the area adjacent to location 22 and a maximum temperature of 410° K. has been reached as measured at location 26. That temperature would have been reduced by release of the stored energy to 110° K. at location 27 prior to resumption of the absorbing phase adJacent to location 22. Using these conservative figures, it is established that the energy flux and hence the reaction forces generated by it are approximately 250 times greater at location 26 than at location 27. The vector lines defined by the forces generated by the progressive but diminishing release of energy from surface portion 21 is illustrated by area 28. The resultant of the sum of the forces generated by applying the disclosed method is indicated by vector arrow 29. It is understood of course that both object 10 and device 20 have also undergone translation movement in response to force 12. The magnitude of 12 as well as the ones produced by the release of the redirected energy absorbed at location 22 is greatly increased by the presence of free particles. The disclosed method is efficient in proportion to the surface to mass ratio of the device. On the Echo series balloon satellites which have a large surface and small mass, the disclosed method would be most effective if the skin area substantially parallel to the resulting axis of rotation would be rendered non-reflective and the orbit heights would be reduced from the 1000 km range to an altitude with more free particles; since it is reported that at their present heights forces from radiation pressure are an observed 250 times greater than those produced by the action of free particles. Space craft 30 has in additicn to an absorbent surface portion 31 that can be rotated about axis of rotation 32 shading means 33 held in alignment to axis of rotation 32 by either geotropic or heliotropic attitude stabilization means that are well known to those skilled in the art or by means of those specially described in this disclosure. The rotation of surface portion 31 that is indicated by arrow 34 can be initiated and controlled by bringing a force 35 to bear on the surface portion 31 in any of the manners available. Solar radiation is absorbed on surface portion 31 at location 36 and after transformation to storable energy carried in surface portion 31 past shading means 33 into area of location 37 where it is released into the environment as radiant energy and energizing of any free particles adJacent surface portion 31. The shading means 33 is in this case opaque to infrared radiation, but could have other characteristics to intercept other types of radiation either striking or being emitted from absorbing surface portion 31. The peak of temperature is thus shifted or maintained to the vicinity of location 37, since neither radiant energy nor energized particles can be released past shading means 33 into the environment and its steep temperature gradient. The area 38 defined by the sum of the reaction forces on the absorbing surface portion 31 has accordingly as resultant the vector 39. This of course defines the forces as compared to the reference body 10 and not necessarily a motion in a sense opposing the direction of incoming radiation 11. Such motion can of course be achieved as demonstrated in the course of the prosecution of applicants U.S. Pat. No. 4,403,755, provided that sufficient particles are present adjacent location 37. It is also evident that any free particles adjacent absorbent surface portion 31 and carried along with it in its rotation past shading means 33 are prevented from generating reaction forces on device 30 while between surface 31 and shading means 33. Shading means 33 comprises accordingly an effective retaining means to retain particles adjacent to the heated area of surface portion 31. Instead of using the step of selectively positioning the shading means 33 an alternative step to carry out this mode of the method is to store the absorbed solar radiation 11 in the form of a storable energy that has a controllable delay time until the full release of the stored energy. This can be achieved by making a phase changing substance or a substance undergoing a reversible chemical reaction part of the absorbing surface portion 21. If for example that surface portion comprises shallow containers of water, that allow for the expansion when the water is heated to 376° K. and boils, the decline of the amount of energy released into the environment illustrated on device 20 will not occur in the locations where the heat of condensation or heat of fusion is released. This effect is illustrated by the shape of area 28 at location 18. The selection of the type and amount of such substances present in the absorbent surface portions will accordingly permit to carry out the disclosed method more efficiently. The diagram of FIG. 1 is two dimensional and it is assumed that the axis of rotation of devices 20 and 30 is positioned by attitude control mechanism substantially normal to the direction of the radiant energy. If the direction of the required thrust forces is at an angle to the direction of the incoming radiant energy, the axis of rotation has to be accordingly inclined taking into account the resulting gyroscopic and precession forces. The illustration of the forces generated by the use of the methods as shown in FIG. 1 demonstrate accordingly that the method can be carried out on an inert object such as space debris, a device of the prior art by using equipment present on it or most efficiently by the use of the preferred embodiments, which are illustrated diagrammatically in the following figures.

Figure 2:
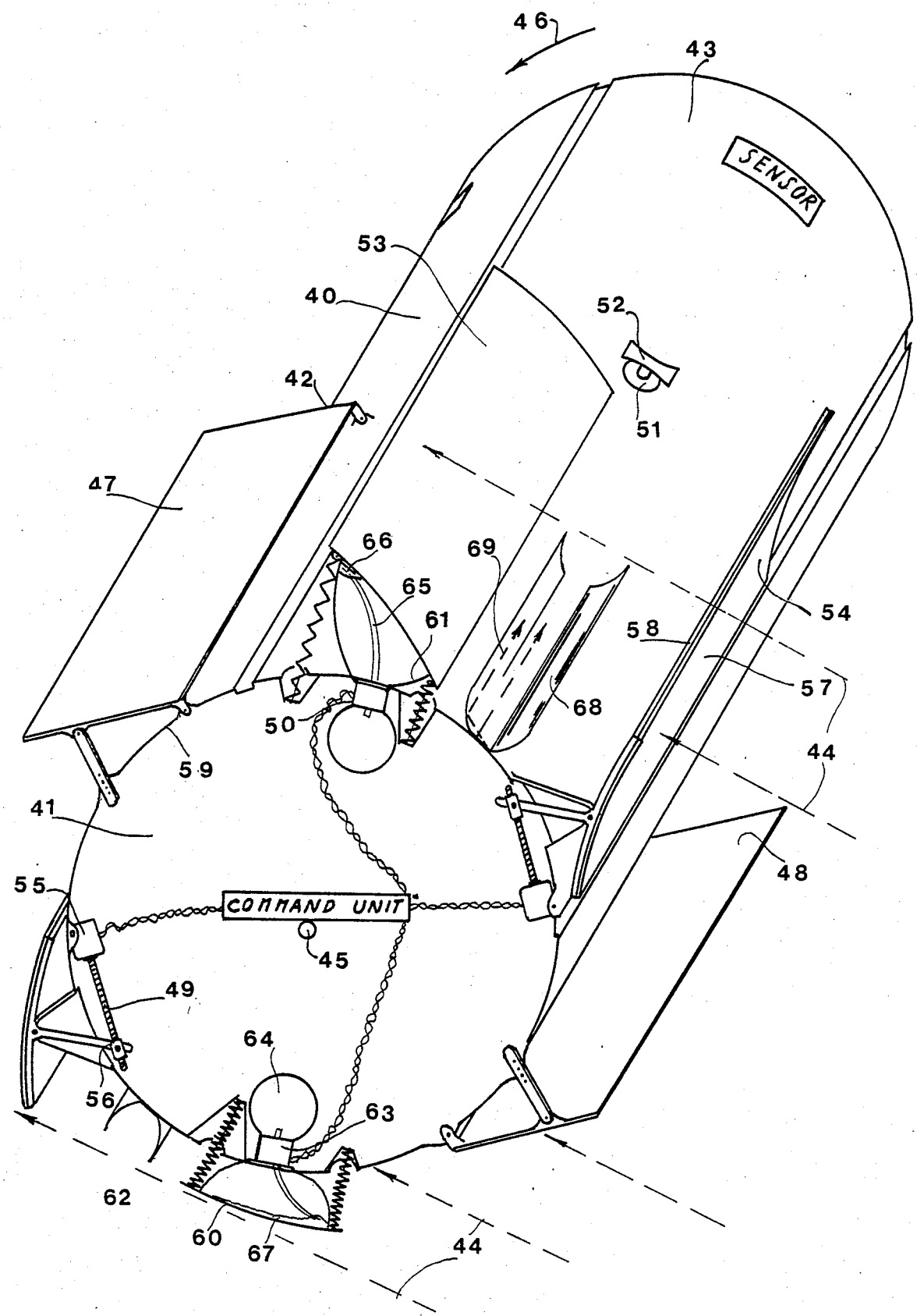
FIG. 2 is a diagrammatic, partially sectional view of a space vehicle in accordance with the present invention.

In FIG. 2 is seen an isometric view of space craft 40, in partially sectioned view to reveal some details of the interior 41 that may house all the equipment assembled by those skilled in the various arts pertaining to the specific mission of device 40. The description of this and the other embodiments are limited to the apparatus as it affects the carrying out of the disclosed method. Those skilled in the art can be trusted with the choice of materials and construction details that are dictated by the launch forces and the particularities of the space environment on selected missions. Space craft 40 has a periphery 42 that has at least one surface portion 43 that is absorbent to radient energy arriving in rays 44. The whole device 40 and with it the absorbent surface portion 43 can be freely rotated about an axis of rotation 45 that will establish itself in a line through the center of mass of device 40. For best efficiency of the disclosed method the craft 40 should be tilted by the well known attitude control means so that axis of rotation 45 is substantially normal to the direction of rays 44. If the axis of rotation has to be for some design reason inclined to the incoming radiation, the periphery of that device could be shaped so that some area of the absorbing surface portion is normal to the rays of the received radiation. To control the direction and the rate of rotation or spin of device 40 that is indicated by arrow 46, control means are provided. The simplest of these control means are the absorbent members or vanes 47 that have inner insulating surface 48 and are fixed in a substantially tangential angle to surface portion 43. Radiant energy 44 strikes some of vanes 47 and similar structures edge on, and others in a substantially normal direction. The rays 44 passing vanes 47 edge-on are instead absorbed on surface portion 43 which is closer to axis of rotation 45. Accordingly a surplus of storable energy is released from outer skins of the vanes as they pass the position normal to rays 44 and on those vanes the radiant energy 44 is absorbed and released at a greater distance than on the periphery 42 in general. Insulating surfaces 48 assure that storable energy is released in a substantially normal direction from the outer absorbent skins of vanes 47. Additionally vanes 47, when thoroughly heated are slightly prolate, contributing to the transportation of storable energy in the direction 46. To reverse the action of the forces thus produced, conventional attitude control can be used to rotate the axis of rotation through 180°. This maneuver is not necessary with the control means that comprise a command unit that could be a "black box" adapted to receive manual input or to respond to remote commands, or to respond to data from sensors that monitor the temperature, rotation or attitude or position of device 40. The command unit correlates such input and sends suitable signals to actuators 49, 50 or 51 that are adapted to activate mechanism that are provided on the periphery 42 to control the direction of thrust forces on device 40. Such could be the well known vernier thrusters 52 installed adjacent to absorbent surface portion 43, the pivotingly attached members or vanes 54 or the members with expandable fluid containers 53. The actuators 49 are geared motors 55 and linkages 56 that permit tilting of members 54 with respect to axis of rotation 45. Selective use of the actuators 49 affords therefore the choice to vary the area of vanes 54 exposed to radiation 44 at different locations during the revolution of surface portion 43, or to vary the distance of part of vanes 54 from the axis of rotation 45. In this instance all the members 54 are adjusted at the same angle. Therefore, during the rotation the rays 44 strike vanes 54 edge-on on the advancing side, minimizing absorption on the absorbent outer surfaces 57. Conversely, the outer surface 57 is fully exposed to radiation 44 at the receding side making them hotter there. Since the reaction of the release of the thus absorbed radiation acts in a substantially normal direction to the plane of surfaces 57, the result of absorption, transportation and release of energy from surface 57 is to promote the rotation 46 and the translation of vehicle 40 at an angle to rays 44. Development tests have shown that rays 44 absorbed on the advancing side in the vicinity of actuators 49 are not reradiated in such a directional and selected manner. A further apparatus detail designed to maintain the rotation 46 against the mentioned dampening forces is the construction of vanes 54. The absorbent outer surface portion 57 could be a layer of nickel which is suitable to receive a selective surface treatment like the one known to those skilled in the art as "Nickel Black" or other suitable absorbent treatment compatible with the space environment. This outer surface 57 is bonded to an inner layer 58 of a material with a high coefficient of heat-expansion such as aluminum with a reflective surface facing the interior 41. In this it is similar to reflective surface 59 which controls heat flow by radiation to and from absorbing surface portion 43 and enhances its capacity to store absorbed energy during rotation. In the process of carrying out the method, heat derived by absorption of radiant energy 44 is with delay conducted from surface 57 to layer 58 which in response expands more than layer 57. This naturally occurs when vane 54 is saturated with storable energy after it has passed during rotation 46 some of the rays 44. The members 54 are accordingly prolate as they recede from the direction of rays 44, generating there reaction forces by the release of the increased amount of energy that was absorbed on the extended members 54, thus favoring both the rotation 46 and the described translation movement. For illustration clarity members or vanes 54 have been shown both with tilt control means or actuators 49 as well as heat-expandable material in layer 58. It is understood that vanes 54 could alternately be fixed on surface portion 43 and become erect when heated by the shown use of a heat-expanding material. The direction of the thrust forces produced by the absorption and release of radiant energy is thus shown to be controlled by the selected tilt of the absorbent members, the selective change of the distance of the absorbent members to the axis of rotation by the use of actuators, or the selective change of the tilt and/or distance of the absorbent members to the axis of rotation by the choice and use of a heat expanding material. Another means to acheive this control is to selectively vary the amount of absorbent substance present in absorber or fluid containers 53. They comprise radiation absorbent outer skins 60 which might be made of a durable metal and flexible inner skins 61 which might be made of such suitable material as the reinforced aluminized polyesters used in the mentioned satellite balloons. Containers 53 are attached to the rest of absorbent surface portions 43 by controllable springs 62. Sealed onto containers 53 are actuators 50 that are means to control the mass of fluid inside containers 53 and which consist of motor driven pumps 63 and reservoirs 64 and optionally suitable separator mechanism. The pumps 63 communicate with containers 53 via extendable tubes 65 terminating adjacent skins 60. When serving to carry out the present method, rotation will carry and hold any free substance in container 53 in contact with the inner walls of skins 60. A suitable substance could be water which has fluid phases and has other desirable properties exploitable by those skilled in the art. The considerable heat generated on walls 60 by absorption of rays 44 is transmitted by conduction to the water 66 clinging to skins 60, evaporating it and expanding by the resulting volume and pressure increase the containers 53 against the restraint of springs 62, one of which is shown to be selectively biased to tilt container 53 in a manner described in connection with vanes 54. The storing of the absorbed energy comprises thus the heat of evaporation that will be released when skin 60 has been cooled by the release of energy to 375° K., whereupon the fall in temperature will not continue until the heat of condensation is released from water 66 into the environment. The same process is repeated as the rotation 46 carries containers 53 into a location where their temperature has fallen to 275° K. and energy released by surface 60 is replenished by the heat of fusion of ice 67. These two reversible processes influence the rate of absorption as well as the rate of release of the energy derived from rays 44, and therefore the direction of the reaction forces derived from the application of the disclosed method. The degree of tilt of containers 53, the temperature rise and the duration of the release of the heat of condensation and of fusion are controllable by selectively varying the amount of water 66 in containers 53 by controlled transfer to or from reservoir 64. If advantageous, this step of the method can be made to be synergistic with the regeneration of distilled water by the inclusion of suitable separation means. Alternately any of the many other substances known to those skilled in the art can be used to influence the release of the storable energy, such as eutectic salts or substances undergoing reversible chemical reactions. These choices are left to those skilled in the art according to the other requirements imposed on the design of device 40 by the nature of its mission. Both vanes 54 and containers 53 can also be used to reverse the rotation 46 by reversing their tilt. Such control of the rotation can also be achieved by the well known auxiliary thrusters 52 activated by command signals to actuators 51 containing the well known pump, valve and ignition means. It is apparent that the disclosed method can be carried out singly with any one of the described control means to redirect release of energy derived from rays 44. They have been grouped together for illustration clarity only and to reflect the praxis of designing redundancy into flight systems. The detailed description of these control means that can be advantageously used to control the absorption, conversion, storage and release of energy derived from radiation 44 have been omitted from the other preferred embodiments of the invention that all have at least one absorbing rotating surface portion that would function as a simple absorbing surface, but which would be more efficient if the described mechanism are understood to be enclosed. This is also the case of directing means or reflectors 68 that are positioned on absorbing surface 43 so that it is substantially at their focus. Thus radiation emitted from surface 43 or particles repelled from it will be re-directed along path indicated by lines 69. This apparatus detail makes possible the step of the present method to make the release of the emitted radiation and energized free particles unidirectional. In the uncontrolled release of energy from an emitting surface like surface portion 43, the radiation is diffuse and not all particles impart all their inherent kinetic energy to the vehicle 40. However as illustrated by phantom lines 69, both particles and the initially diffuse radiation is brought into a selected direction by the action of reflective members 68. By choice another step of the invented method can be carried out using the described arrangement. This step comprises the action of concentrating the incoming rays 44 onto a selected area of absorbent surface portion 43. While such focusing does not increase the amount of energy absorbed from rays 44, it raises the temperature of the areas of surface 43 that receive these redirected rays. As seen from the discussion of FIG. 1, such higher temperatures cause a disproportional large release of energy at a selected location, namely away from the direction of the rays 44. The amount of energy derived from these concentrating collectors 68 can be further enhanced when they are positioned on areas that to a degree track the position of the source of rays 44 as is done by the action of the surfaces 57 and 60. For the step of the method that accomplishes the concentration of radiation 44, the directing means or reflectors 68 could be embodied by prisms or lenses, particularly if filtering of radiation 44 is an advantage.

Figure 3:
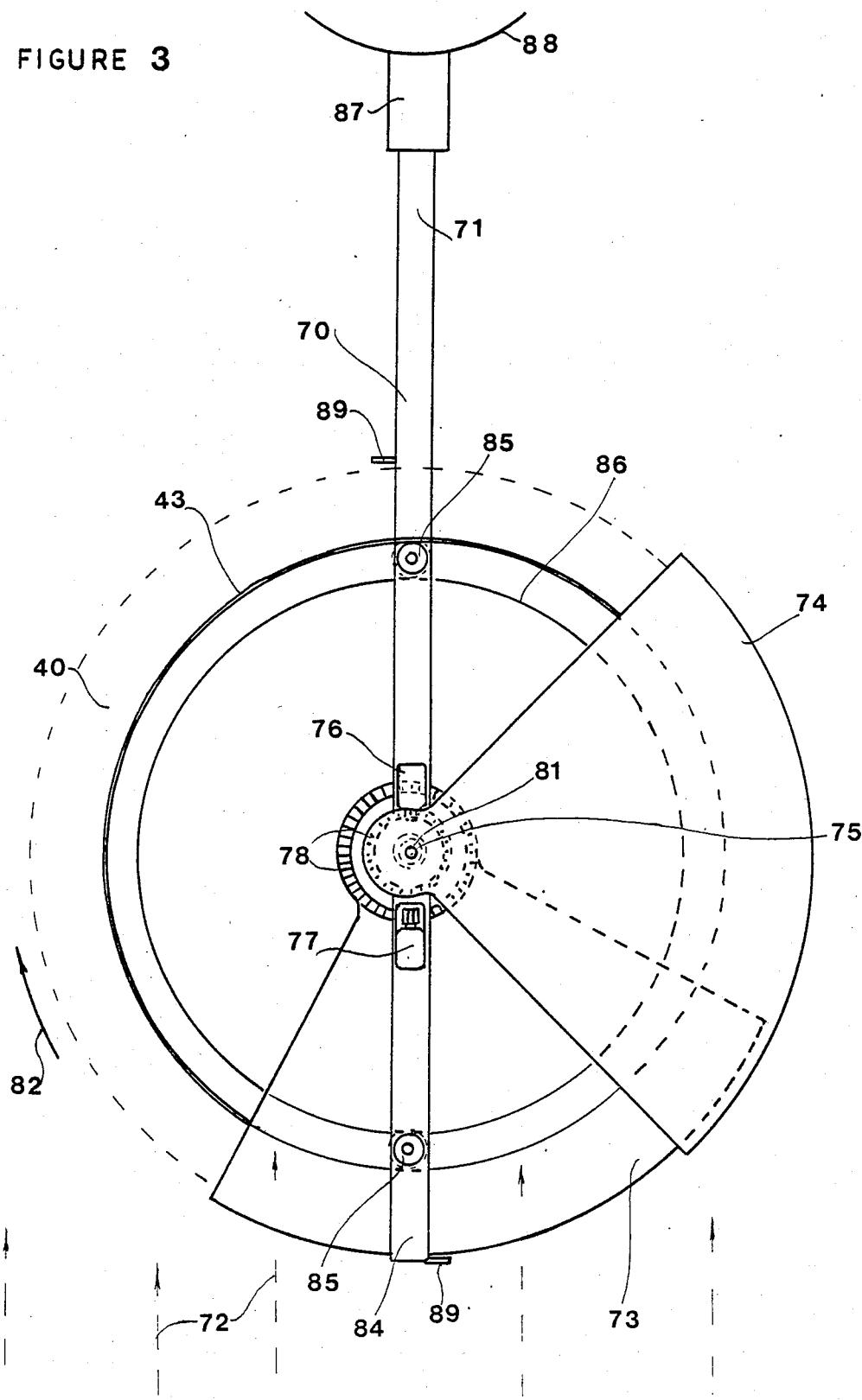
FIG. 3 is a diagrammatic partially sectional view of an artificial satellite in accordance with the present invention.

In FIG. 3 is diagrammatically depicted space craft 70 that is attitude controlled by the boom and mass 71 using the well known gravitation gradient system. The device 70 is partially shaded from direct solar radiation 72 by shading means 73 and 74. The partial sectioned view shows axis of rotation 75 about which shading surfaces 73 and 75 can be rotatably adjusted using motors 76 and 77 by means of the indicated gear drives 78. Within the space defined by the interior of the shading means 73 and 74 is located the rotatable member 40 having absorbent surface portion 43 guided about axis 75 by suitable bearings 81. The rotatable member 40 resembles device 40 and is understood to be adapted for control of the rotation indicated with arrow 82 by any one or all of the multiple torque generating means shown in detail on device 40, but is primarily rotated in a selected direction by drive means or motor driven rollers 85 mounted on frame 84 of device 70. These rollers 85 are only illustrative of the drive means available. Those skilled in the art might find the well known linear drives here suitable for certain applications. The drive means 85 are in disengageable contact with the inner cylindrical cavity 78 of absorbent surface portion 43 and simultaneously with the surface of optional inertia wheel 86 counterrotatingly centered on axis 75 by appropriate bearings. Energy for the motors can be provided by the well known solar panels, fuel cell or solar thermal devices known to those skilled in the art. Control signals are directed to all the motors from command module 87 that accepts input manually transmitted or remote commands through antenna 88 so as to selectively control the vector of rotation 82 or the position of shading devices 73 and 74. In carrying out the disclosed method, once the direction of the required thrust forces has been established, the command module 87 would be instructed to signal the driving means 85 to give absorbing surface 43 rotation 82 to transport storable energy derived from radiation 72 toward the direction in which its release is required. Simultaneously the optional counterrotating inertia wheel 86 is accelerated to equalize any torque forces and reduce the effect of the gyroscopic forces of the rotating mass of absorbing member 40. This counterrotating system could serve also as energy storage and the inherent auxiliary space craft functions discussed earlier. The rollers 85 are adapted by the well known but not shown clutching means to be selectively engageable to their motors and to contact either/or both flywheel 86 and member 40. Thereby the rotation 82 and thus the absorption and release of energy on surface 43 is controlled. Shading means 74 is reflective on the inside thus equalizing the forces due to energy release at this location which is opposite the direction of maximum energy release. The shading device 73 is transparent to most of the visible light in radiation 72, but opaque to the infrared emitted from surface 43 and may comprise sheets of silicate or the polymer films that are well known to those skilled in the art and which absorb and reflect long wave radiation. The shading means 73 covers the portion of the rotating surface 43 that is advancing toward radiation 72 and allows absorption without the undesirable loss through re-radiation in this direction. Temperature sensors 89 register the rate of release of energy from absorbent surface 43. Monitoring of the temperature differences while the rotation 82 is varied or the positions of shading devices 73 and 74 are adjusted permits determining the resultant of the forces generated on rotating surface 43. By appropriate input into command module 87 the function can than be adjusted until the apparent resultant coincides with the selected direction of the required thrust. This step is understood to be possibly part of the method carried out on all the embodiments. The axis of rotation 75 is located on a line passing through the center of mass of device 70. The area of surface portion 43 is also substantially centered on this center of mass. Small adjustments in attitude of device 70 can be effected by varying the position of axis 75 and the position of absorbent surface portion 43 along that axis. The shown rotation control apparatus and shading means are therefore effective control means to establish the direction of the required thrust forces.

Figure 4:
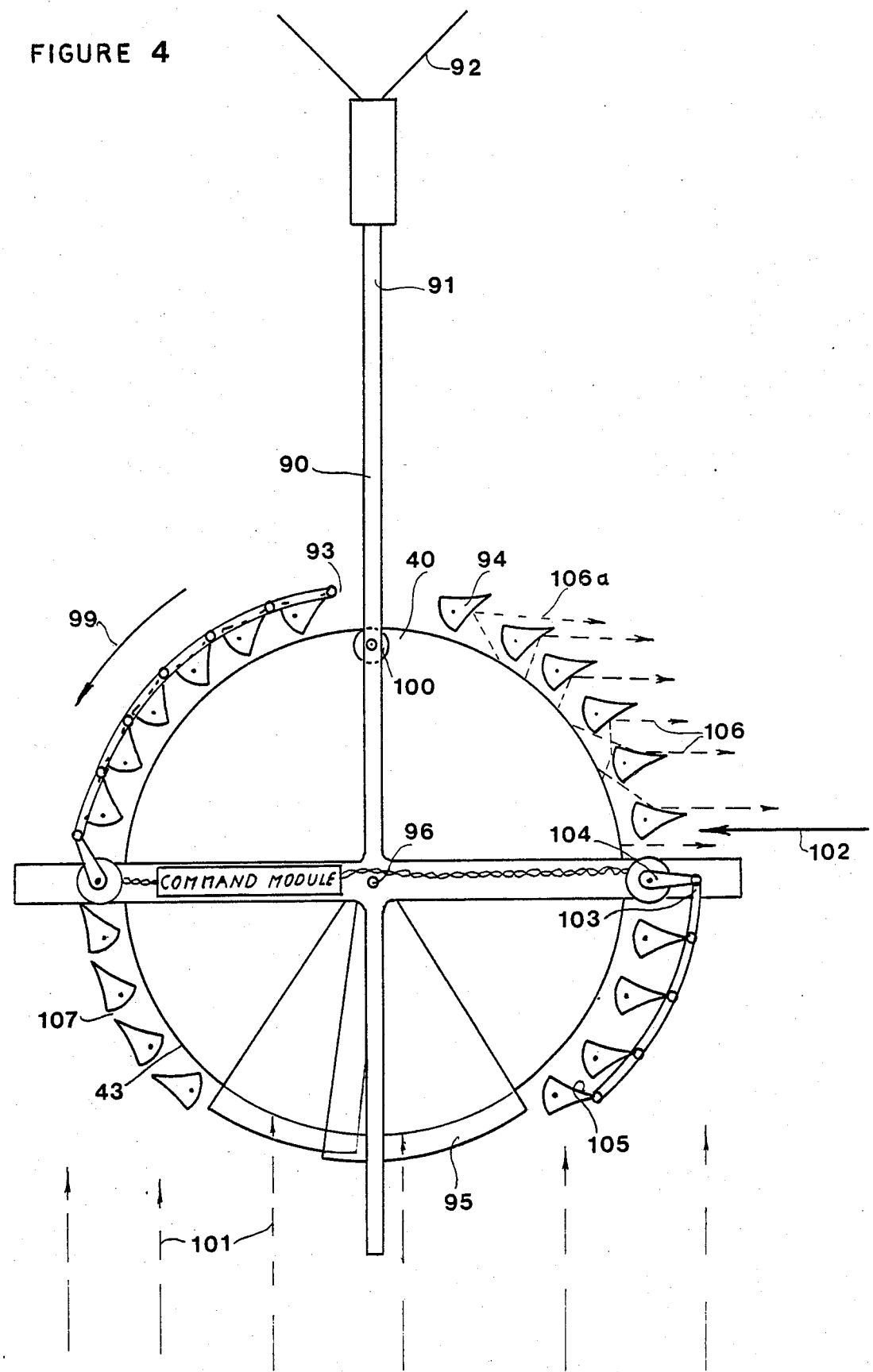
FIG. 4 is a diagrammatic sectional view of an artificial satellite in accordance with the present invention.

In FIG. 4 is seen in partially sectioned top view the diagrammatic representation of space craft or device 90 that has attitude stabilization by the boom and mass 91 and solar vanes 92. The periphery 93 comprises a shell of adjustable louvers 94 and positionable filter sheets 95. Within the periphery 93 and on axis 96 is disposed rotating member 40 comprising absorbent surface portion 43. Member 40 resembles device 40 and is rotated in direction 99 by the drive means 100. Thus storable energy derived from the absorption of radiation 101 is transported in surface portion 43 in direction 99. The direction of the required thrust has been determined and is indicated by arrow 102. The louvers 94 are accordingly opened by actuating means 103 in this direction. Actuating means 103 comprise the familiar linkage and motor 104 controlled in the manner described with signals from a command module. Louver vanes 94 have reflective surfaces 105 defining in an open position a parabolic trough with the focus located substantially on surface 43. Accordingly diffuse radiation emitted from surface 43 and energizes particles repelled from it are re-directed and released from device 90 along phantom lines 106 resulting in reaction forces in the required direction 102. Between radiation 101 and absorbent surface portion 43 are disposed shading or filtering means 95 that have the previously discussed quality to limit re-radiation of long wave radiation into the environment and that also serve as retaining means for free particles energized adjacent to surface 43. Louvers 94 in the area opposite the direction 102 are positioned to shade surface 43 from the environment and reflect the residue of the radiation emitted from surface 43 back to it, but to admit free particles through gaps 107. Louvers 94 in the area near boom 91 are selectively angled to direct radiation and free particles into the direction 106a that also results in reaction forces in the required direction 102. Louvers 94 with their actuating means 103 are control means employable in the disclosed method as shading means, radiation directing means, particle directing means and particle retaining means. By the selective use of louvers 94 as shown, the peak operating temperature of surface 43 can be maintained high, hence making energy release rapid and efficient. Further the carrying out of the disclosed method can be made independent of the direction of the rotation of member 40. Even greater efficiency is evident from the consideration that part of member 40 is endowed with one or more of the mechanism controlling the release of the storable energy.

Figure 5:
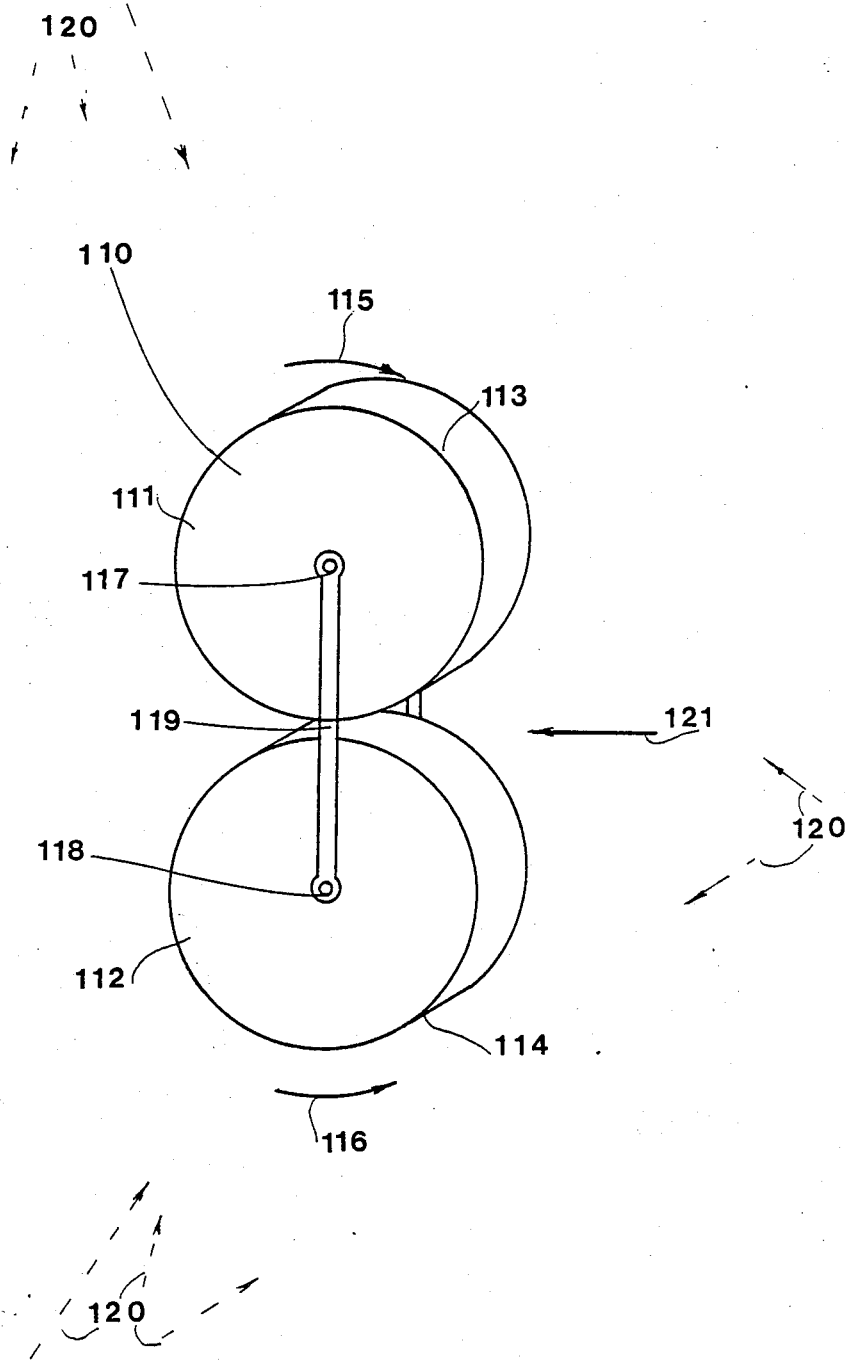
FIG. 5 is a diagrammatical isometric view of a space craft in accordance with the present invention and FIG. 6 is a diagrammatic top view of space vehicles in accordance with the present invention in different orbits.

Attention is now drawn to FIG. 5 where is seen a diagrammatic representation of device 110 which comprises two rotating members 111 and 112 with absorbent surface portions 113 and 114. Their rotations are represented by arrows 115 and 116 and are understood to be imparted and controlled by any one or all of the previously disclosed torque controlling means, that have not again been detailed so as to avoid repetition and to preserve illustrative clarity. Members 111 and 112 are rotatingly disposed about axis of rotation 117 and 118 which are linked by frame 119. Other equipment relating to the functioning of the device 110 and attitude control means to control the tilt of axis 117 and 118 are attached to frame 119. The rays of radiation 120 are seen to be diffuse and also to come from two sources of radiant energy. As this radiation is absorbed on the absorbent surface portions 113 and 114, the storable latent energy thus derived is transported by rotation 115 and 116 toward the location of arrow 121 that represents the chosen direction of the required thrust and is normal to the plane defined by the two axis of rotation. It is seen that the surface portions 113 and 114 are therefore converging as they have reached their maximum content of storable energy. The reaction forces resulting from the release of that storable energy results accordingly in a thrust force in the required direction 121. If advantageous, space craft 110 could be provided with more than two members like 111 and 112 and linked into a doughnut shaped assembly.

Figure 6:
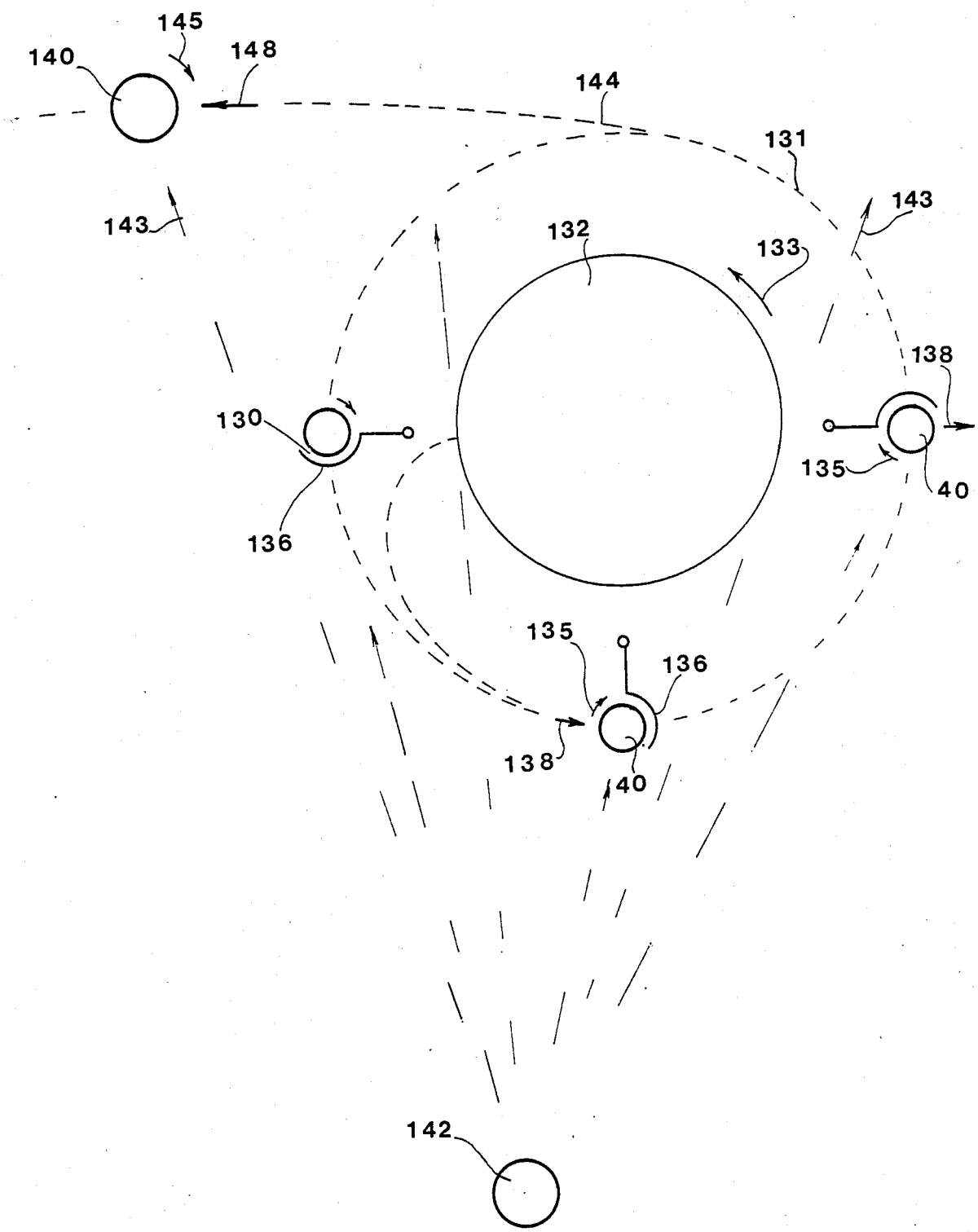

The application of the propulsive properties of the disclosed absorbent and rotating devices using the disclosed method is shown in FIG. 6 which is a diagramatic top view of the eccliptic of the solar system with space craft 130 in orbit 131 about planet 132 and space craft 140 in orbit 141 about the sun 142 giving off radiant energy 143. Space craft 130 was launched in the common manner in the direction of the rotation 133 of planet 132 and resembles in configuration devices 30 or 70, and having rotating member 40 in rotation 135 and shading means 136. Device 130 is geotropically stabilized by the well known attitude control means. Arrows 138 show accordingly the resultant of the thrust forces derived with the disclosed method of absorption and re-directed release of solar energy. It is seen that these resultants indicate energy input into the orbital velocity or the angular momentum of space craft 130. In the phases of the orbit where solar radiation would tend to retard space craft 130 on orbit 131 by the action of rotating member 40, it is shaded by either planet 132 or shading means 136. Repositioning them or reversing the direction of rotation of rotating member 134 will accordingly slow space craft 130. In a polar orbit the axis of rotation of member 40 would be inclined 90° to the here shown orientation. Space craft 140 resembles the embodiment of the freely rotating device 40. After leaving earth orbit in the known advantageous manner indicated by line 144, device 140 is constantly exposed to radiation 143. The attitude control required for the carrying out of the disclosed method is accordingly tilt control of the axis of rotation of space craft 140. The thrust forces produced by the disclosed method with rotation 145 indicated by arrow 148 will gradually increase its orbital velocity until all the forces acting on the device 140 balance the thrust force produced by the disclosed method which will decrease with the square of the distance from the sun. Space craft using this method would have by design a large surface to mass ratio in order to maximize the effect produced on device 140 by the disclosed method. Since planet 132 has a large mass to surface ratio, the effect of the applied method will be a gradual increase in the distance and the acceleration of space craft 140 with respect to planet 132.

From the preceding description it is accordingly shown that the present invention discloses to those skilled in the art a simple but novel system to develop control and utilize thrust forces on objects or devices without the expenditure of on-board propellants or reduction of mass. The disclosed method is further synergistic with several other space craft functions, an unexpected boon that facilitates its implementation. The functioning of the present invention is verified by the laws and natural processes to which it compares and of which it is a refined application.

I claim:

1. A method for providing, controlling and utilizing thrust forces in a selected direction on an object having an axis of rotation and positionable in an environment having at least some free particles and a temperature difference with said object, said environment containing at least one source of radiant energy, said object comprising at least one absorbent surface portion having the capacity to absorb said radiant energy, to convert said radiant energy to storable or latent energy, to store said storable or latent energy and to release said storable or latent energy, the improvement comprising the steps of:
   (a) selecting the direction of the required thrust forces to be provided on said object,
   (b) determining from the position of said source of radiation, said temperature difference and said capacity to absorb, the direction and speed of rotation of said surface portion required to move said surface portion exposed to said radiant energy toward a direction pointing away from the direction of the required thrust forces, so that the resultant of the forces from the potential release of said storable or latent energy substantially coincides with the said direction of the required thrust forces,
   (c) causing the rotation of said surface portion by bringing a force to bear on said surface portion in a selected direction and strength so as to move said surface portion facing said radiant energy in a receding movement with respect to the direction of said radiant energy and toward the direction opposite to the direction of the required thrust forces,
   (d) providing said thrust forces by causing said surface portion to release said storable or latent energy as radiation into said environment in a direction substantially opposite to the direction of the required thrust forces and by creating radiation pressure against said object in reaction to the release of the said radiation,
   (e) providing said thrust forces by causing said surface portion to release said storable or latent energy by energizing and repelling said free particles adjacent said surface portion in a direction substantially opposite to the direction of the required thrust forces and by creating a reaction force against said object by the repelling of said free particles.

2. A method as defined in claim 1 wherein said object is a device or space craft of the prior art having on-board control means to control its rotation and wherein said method comprises the further step of:
   selectively activating said control means to control the rotation of said surface portion.

3. A method as defined in claim 1 wherein said object is a device or space craft according to the present invention having control means to control the direction of the thrust forces generated by the release of said storable energy, said control means comprising vanes extending outward from said surface portion in a substantially tangential angle with respect to said axis of rotation, said vanes having absorbent skins facing away from said axis of rotation, and wherein said method comprises the further step of:
   positioning said vanes with respect to said source of radiant energy so that said radiant energy passes at least one of said vanes edge-on where said device faces the direction of the required thrust forces and absorbing said energy adjacent said one vane in the edge-on position on said absorbent surface portion close to said axis of rotation, and absorbing said radiant energy on the said absorbent skins at a greater distance to said axis of rotation, causing thereby the amount of radiant energy absorbed on said outer skins and said storable energy released from said skins to be greater in the direction opposite to the direction of the required thrust forces.

4. A method as defined in claim 1 wherein said object is a device in accordance with the present invention having an axis of rotation and comprising control means to control the direction of the release of said storable energy, said control means comprising heat-expandable members disposed on said surface portion, said mehtod comprising the further step of:
   increasing the distance of said heat-expandable members to said axis of rotation by heating them with said storable energy during exposure to said radiant energy and to decrease the distance of heat-expandable members to said axis by cooling them through release of said storable energy.

5. A method as defined in claim 1 wherein said object is a device in accordance with the present invention and where there are disposed on said device members or vanes selectively tiltable in respect to said device by actuators said members having absorbent outer surfaces, and wherein said method comprises the further step of:
   selectively tilting said members by activating said actuators so that said members present said absorbent outer surfaces to said source of radiant energy during said receding movement.

6. A method as defined in claim 1 wherein said object is a device or vehicle according to the present invention having means to control the direction of the thrust forces generated by the release of said storable energy, said control means comprising absorbent containers containing a substance for storing said storable energy, said device comprising a pump for selectively varying the amount of said substance in said containers, said method comprising the further step of:
   selectively varying the amount of said
   substance for storing energy so as to selectively control the temperature of said containers and the release of said storable energy.

7. A method as defined in claim 1 wherein said object is a device or vehicle according to the present invention having means to control the direction of the thrust forces generated by the release of said storable energy during said rotation of the absorbent surface portion, said control means comprising absorbent containers containing a phase-changing substance and wherein said method comprises the further step of:

storing said storable energy by changing the state of said phase-changing substance and where the release of said storable energy comprises changing the state of said phase-changing substance, thereby providing additional storable energy to be released in a selected direction.

8. A method as defined in claim 1 wherein said object is a device in accordance with the present invention wherein there are provided focusing means for concentrating said radiant energy onto a selected area of said absorbent surface portion and wherein said method comprises the further step of:

increasing the level of said storable energy stored in said selected area by concentrating said radiant energy with said focusing means onto said selected area, thereby increasing the temperature difference of said selected area and said environment and accordingly the initial rate of release of said storable energy.

9. A method as defined in claim 1 wherein said object is a device in accordance with the present invention where said absorbent surface portion is disposed on a member that is rotatingly mounted on an axis of rotation provided on said device and where drive means are provided to control the rotation of said surface portion with respect to said device and wherein said method comprises the further step of:

controlling the direction and rate of rotation of said absorbent surface portion with respect to said device by selectively activating said drive means to bring said force to bear in a selected direction on said surface portion.

10. A method as defined in claim 1 wherein said object is a device in accordance with the present invention and where there are provided shading means disposed on said device between said environment and said surface portion, said shading means selectively positionable and adapted to intercept at least part of the radiation emitted from said surface portion in a selected direction or to intercept at least part of said radiant energy striking said device from a selected direction, said method comprising the further step of:

positioning said shading means so as to admit at least part of said radiant energy in a selected direction onto said surface portion and positioning said shading means so as to intercept said radiation and said free particles emitted from said surface portion toward said environment substantially in the direction of the required thrust forces and to restrict the release of said storable energy to the direction substantially opposite to the direction of the required thrust forces.

11. A method as defined in claim 1 wherein said object is a device in accordance with the present invention where there are provided directing means to control the direction of said radiation after it has been emitted from said surface portion and of said free particles after they have been repelled from said surface portion, and wherein said method comprises the further step of:

re-directing said radiation released from said surface portion and free particles repelled from said surface portion into a direction substantially opposite to the direction of the required thrust forces.

12. A method as defined in claim 1 wherein said object is a device in accordance with the present invention and where said radiant energy is diffuse or originating from more than one source and said device comprises at least two counterrotatingly arranged members having absorbent surface portions, said counterrotatingly arranged members disposed about two axis of rotation linked by a frame and defining a plane, said device having means to control the attitude of said plane and control means to control the rotation of said two counterrotatingly arranged members, said method comprising the further step of:

orientating the plane defined by said two axis of rotation substantially normal to the selected direction of the required thrust and rotating said counterrotatingly arranged members with said rotation control means in a counterrotating movement so that said absorbent surface portions are converging when they are facing away from the direction of the required thrust forces.

\* \* \* \* \*

UNITED STATES PATENT AND TRADEMARK OFFICE
CERTIFICATE OF CORRECTION

PATENT NO. : 4,707,979
DATED : Nov. 24, 1987
INVENTOR(S) : Gunter E Gutsche

It is certified that error appears in the above-identified patent and that said Letters Patent are hereby corrected as shown below:

```
Column  2 line 59 change -%- to " ° "
Column  4 line 23 change -obJect- to " object"
Column  5 line 54 change -expend- to " expand "
Column  6 line 16 remove the -on-
Column  7 line 66 remove the -a- before " greater "
Column 10 line 44 change -Ject- to " ject "
Column 10 line 60 change -obJect- to " object "
Column 11 line 25 change -adJacent- to " adjacent "
Column 11 line 50 change -additicn- to " addition "
Column 11 line 64 change -adJa- to "adja "
Column 16 line 16 change -75- to " 74 "
```
Figure 6 reference character 145, change the direction of arrow 145 from clockwise to counterclockwise.

Signed and Sealed this

Seventeenth Day of May, 1988

Attest:

*Attesting Officer*

DONALD J. QUIGG

*Commissioner of Patents and Trademarks*